Patented Mar. 2, 1937

2,072,539

UNITED STATES PATENT OFFICE 2,072,539

ACID TRIPHENYLMETHANE DYESTUFFS

Paul Wolff and Wilhelm Werner, Frankfort-on-the-Main, Germany, assignors to General Aniline Works, Inc., New York, N. Y., a corporation of Delaware No Drawing. Application June 12, 1934, Serial No. 730,359. In Germany June 15, 1933

4 Claims. (Cl. 260—67)

The present invention relates to acid triphenylmethane dyestuffs.

We have found that dyestuffs of good fastness to light, clear tints and a good color in artificial light are obtainable by condensing a 4.4'-dihalogen-benzophenone or a 4.4'-dialkoxybenzophenone with a secondary or tertiary aromatic amine, with the exception of an alpha-substituted indole, then causing the product to react with a primary aromatic amine containing in para-position to the amino group an alkoxy group, especially a methoxy or ethoxy group, or an aryloxy group, especially a phenoxy group, whereby the halogen atoms or alkoxy groups, respectively, in the 4.4'-positions are replaced by the radical of the primary aromatic amine and then sulfonating the products thus obtained.

The dyestuffs thus obtainable are new. There are obtained, for instance, the dyestuffs of the following general constitution—

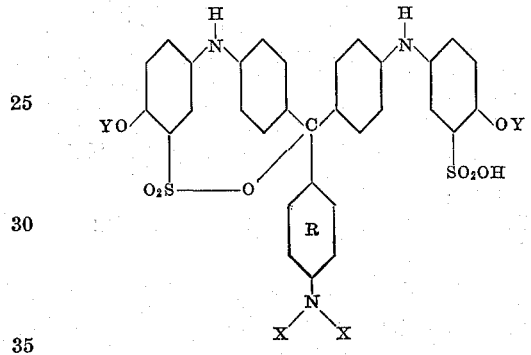

wherein Y means an alkyl or aryl group, X means an alkyl, aryl, aralkyl or formyl group and one X may be hydrogen and wherein the nucleus R may contain substituents.

The following examples serve to illustrate the invention, but they are not intended to limit it thereto; the parts are by weight:

(1) 25 parts of 4.4'-dichlorobenzophenone are condensed with 19 parts of ethylbutyl-meta-toluidine in the presence of 20 parts of phosphorus oxychloride by boiling for several hours in 100 parts of toluene. After distillation of the toluene and the phosphorus oxychloride still present, the condensation product is molten with 60 parts of para-phenetidine. After cooling, the excess of para-phenetidine is removed from the melt by stirring it with dilute hydrochloric acid, wherein the blue basic dyestuff which has been formed is insoluble. After drying, the dyestuff is sulfonated. There is obtained an acid dyestuff which, in the form of its sodium salt, dyes wool and silk bright blue tints which are distinguished by a very good fastness to light and a very good color by artificial light. The dyestuff has the following constitution:

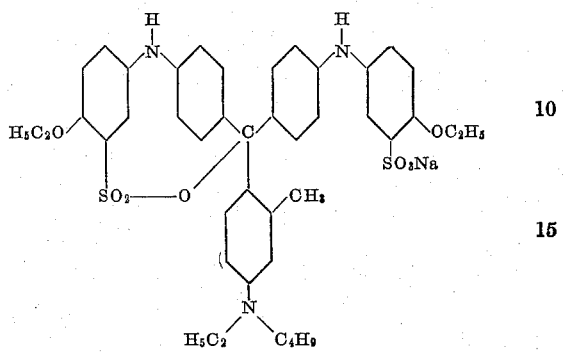

(2) 24 parts of 4.4'-dimethoxybenzophenone are condensed with 18.5 parts of diethyl-meta-chloraniline, as described in Example 1. The condensation product is molten with para-anisidine. A water-insoluble blue basic dyestuff is obtained which, after sulfonation, dyes in the form of its sodium salt wool and silk clear blue tints of a somewhat more greenish shade than that of the dyestuff described in Example 1 and has the same good fastness properties. The dyestuff corresponds to the following formula:

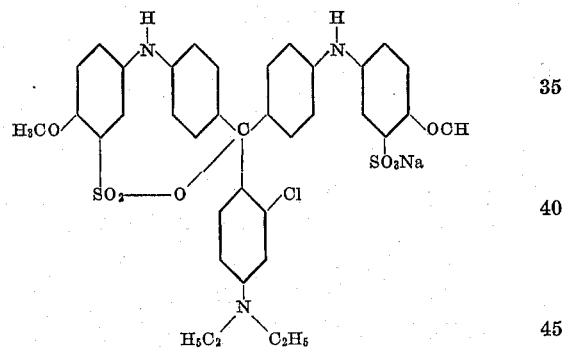

(3) 25 parts of 4.4'-dichlorobenzophenone are condensed with 23.5 parts of symmetric di-n-butyl-meta-xylidine, as described in Example 1. The condensation product is molten in the same manner as described in Example 1 with para-aminodiphenylether, the water-insoluble blue dyestuff thus formed is isolated and sulfonated. It dyes in the form of its sodium salt wool and silk bright very greenish-blue tints of a likewise very good fastness to light and a very good color by artificial light. The dyestuff has the following constitution:

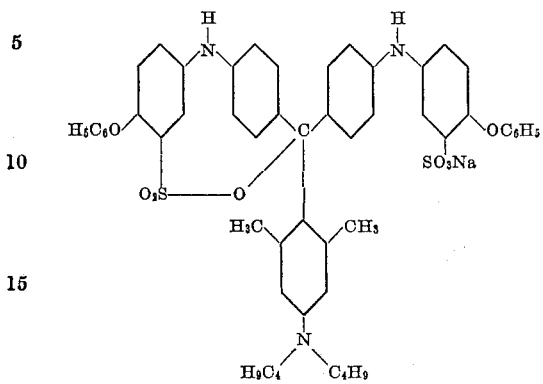

(4) 25 parts of 4.4'-dichlorobenzophenone are condensed in the above-mentioned manner with 22.5 parts of ethylbenzyl-meta-toluidine and the condensation product is molten with 60 parts of para-phenetidine. The excess of para-phenetidine is removed by means of dilute hydrochloric acid and a basic water-insoluble dyestuff is obtained. By sulfonating it, there is obtained an acid blue dyestuff which dyes in the form of its sodium salt wool and silk very clear blue tints similar to those of the dyestuff described in Example 2 and of the same good fastness properties.

(5) 25 parts of 4.4'-dichlorobenzophenone are condensed with 20 parts of ethyldiphenylamine, as described in the preceding examples. By melting the condensation product with para-phenetidine a water-insoluble blue basic dyestuff is obtained which, after sulfonation, dyes in the form of its sodium salt wool and silk clear blue tints which are distinguished by a very good fastness to light and a very good color by artificial light. It has the following formula:

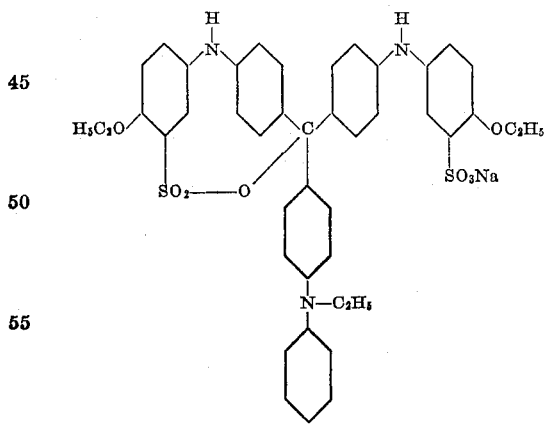

(6) 25 parts of 4.4'-dichlorobenzophenone are condensed with 26 parts of benzyldiphenylamine, in the presence of phosphorus oxychloride, as described in the preceding examples. The condensation product obtained is molten with para-phenetidine; a blue water-insoluble dyestuff is obtained which, after sulfonation, dyes in the form of its sodium salt wool and silk clear blue tints which are distinguished by the same good fastness properties as those of the dyestuffs described in the foregoing examples.

(7) 24 parts of 4.4'-dimethoxybenzophenone are condensed with 20 parts of formyldiphenylamine, as described in Example 1. The condensation product is molten with para-phenetidine and, after sulfonation, a blue dyestuff is obtained which, in the form of its sodium salt, dyes wool and silk beautiful clear blue tints which are distinguished by a very good fastness to light and a very good color by artificial light.

(8) By replacing in Example 5 ethyldiphenylamine by 18.5 parts of methyldiphenylamine, there is obtained, after condensation and subsequent melting with para-phenetidine, a blue water-insoluble dyestuff which, after sulfonation, dyes in the form of its sodium salt wool and silk clear blue tints of similar shade as the dyestuff described in Example 5 and possesses the same good fastness properties.

(9) 25 parts of 4.4'-dichlorobenzophenone are condensed with 20 parts of benzyl-ortho-toluidine in the manner described in the foregoing examples. The condensation product is molten with para-anisidine. The basic water-insoluble dyestuff is sulfonated. The acid dyestuff thus obtained dyes in the form of its sodium salt wool clear somewhat more reddish blue tints than the dyestuff obtained according to Example 4 and possesses the same good fastness properties.

The dystuff corresponds to the following formula:

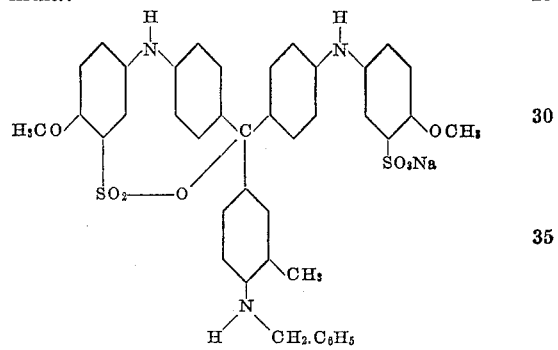

(10) By replacing in Example 7 the formyldiphenylamine by 16.9 parts of diphenylamine, there is obtained, after condensation and subsequent fusion with para-anisidine, a blue water-insoluble dyestuff which, after sulfonation, dyes in the form of its sodium salt wool clear greenish-blue tints and is distinguished by a very good fastness to light and a very good color by artificial light.

We claim:
1. The compounds of the general formula:

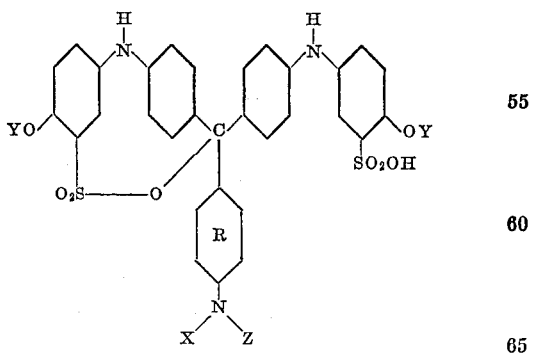

wherein Y stands for a member of the group consisting of alkyl and aryl, X stands for a member of the group consisting of alkyl, aryl, aralkyl and formyl, Z stands for a member of the group consisting of hydrogen, alkyl and aryl and wherein the nucleus R contains a member of the group consisting of hydrogen, halogen and lower alkyl groups, being dyestuffs of very good fastness to light, a clear tint and a very good color by artificial light.

2. The compound of the formula:

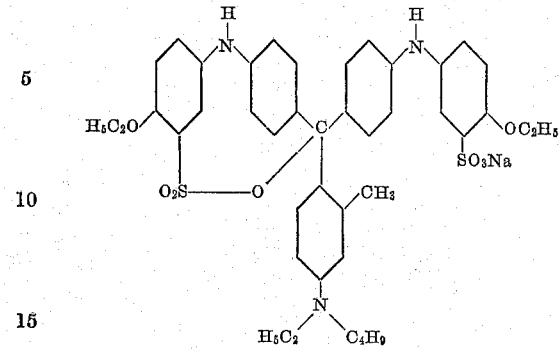

dyeing in the form of its sodium salt wool and silk bright blue tints of very good fastness to light and a very good color by artificial light.

3. The compound of the formula:

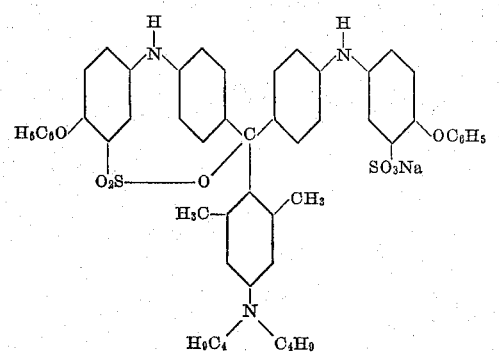

dyeing in the form of its sodium salt wool and silk bright very greenish blue tints of a very good fastness to light and a very good color by artificial light.

4. The compound of the formula:

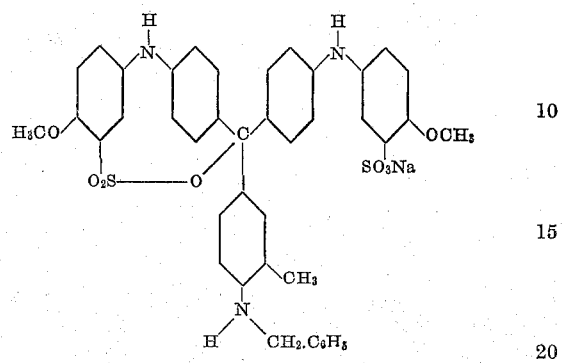

dyeing in the form of its sodium salt wool clear somewhat reddish-blue tints of a very good fastness to light and a very good color by artificial light.

PAUL WOLFF.
WILHELM WERNER.